United States Patent
Gurunathan et al.

(10) Patent No.: US 9,362,815 B2
(45) Date of Patent: Jun. 7, 2016

(54) INPUT-PARALLEL/OUTPUT-PARALLEL INVERTER ASSEMBLY CONTROL DEVICE AND METHOD

(75) Inventors: Ranganathan Gurunathan, Bangalore (IN); Aisur Gopalakrishnan Vishal Anand, Bangalore (IN); Ame Ballantine, Palo Alto, CA (US); Saravanakumar Narayanasamy, Bangalore (IN); Kodali Venkata Narasimha Rao, Bangalore (IN)

(73) Assignee: BLOOM ENERGY CORPORATION, Sunnyvale, CA (US)

( * ) Notice: Subject to any disclaimer, the term of this patent is extended or adjusted under 35 U.S.C. 154(b) by 655 days.

(21) Appl. No.: 13/279,921

(22) Filed: Oct. 24, 2011

(65) Prior Publication Data
US 2012/0098336 A1  Apr. 26, 2012

Related U.S. Application Data

(60) Provisional application No. 61/406,265, filed on Oct. 25, 2010.

(51) Int. Cl.
*H02M 1/10* (2006.01)
*H02J 1/00* (2006.01)

(52) U.S. Cl.
CPC ............ *H02M 1/10* (2013.01); *H02J 2001/004* (2013.01); *Y10T 307/305* (2015.04); *Y10T 307/707* (2015.04)

(58) Field of Classification Search
None
See application file for complete search history.

(56) References Cited

U.S. PATENT DOCUMENTS

| | | | |
|---|---|---|---|
| 5,257,180 A | 10/1993 | Sashida et al. | |
| 5,262,935 A | 11/1993 | Shirahama et al. | |
| 5,414,339 A * | 5/1995 | Masaki et al. | 318/800 |
| 6,362,540 B1 | 3/2002 | Hill | |
| 7,492,058 B2 | 2/2009 | Chen | |
| 7,564,703 B1 | 7/2009 | Braun et al. | |
| 2002/0027791 A1 | 3/2002 | Yoshioka et al. | |
| 2004/0136214 A1* | 7/2004 | Tan et al. | 363/71 |
| 2005/0281064 A1* | 12/2005 | Olsen et al. | 363/71 |
| 2006/0068246 A1* | 3/2006 | Matsuo et al. | 429/19 |

(Continued)

FOREIGN PATENT DOCUMENTS

| | | | |
|---|---|---|---|
| JP | 09275637 A1 | 10/1997 | |
| JP | 2006333625 A | 12/2006 | |

(Continued)

OTHER PUBLICATIONS

Choi, W., et al. "Fuel Cell Powered UPS Systems: Design Considerations"; 2003 IEEE PESC, pp. 385-390; Jun. 2003.

(Continued)

*Primary Examiner* — Ula C Ruddock
*Assistant Examiner* — Tony Chuo
(74) *Attorney, Agent, or Firm* — The Marbury Law Group PLLC

(57) ABSTRACT

A method includes controlling multiple networked input-parallel/output-parallel inverters of a fuel cell system as a single inverter assembly by a master controller. A fuel cell system includes a plurality of fuel cell segments, a plurality of DC/DC converters and at least one DC/AC inverter, where an output of each of the plurality of the fuel cell segments is connected to a pair of DC/DC converters, and each of the pair DC/DC converters is connected to an opposite polarity bus being provided to the inverter.

19 Claims, 8 Drawing Sheets

(56) References Cited

U.S. PATENT DOCUMENTS

| | | | |
|---|---|---|---|
| 2007/0194627 A1* | 8/2007 | Mori et al. | 307/103 |
| 2008/0106100 A1 | 5/2008 | Hyvarinen | |
| 2008/0280175 A1 | 11/2008 | Gurunathan et al. | |
| 2009/0058329 A1* | 3/2009 | Ichikawa | 318/139 |
| 2009/0088915 A1* | 4/2009 | Kizaki | 701/22 |

FOREIGN PATENT DOCUMENTS

| | | | |
|---|---|---|---|
| JP | 2007288996 A | 11/2007 | |
| TW | 513835 B | 12/2002 | |
| WO | WO2006044934 A2 | 4/2006 | |

OTHER PUBLICATIONS

International Search Report and Written Opinion issued in PCT Application No. PCT/US2011/057440, mailed on Apr. 27, 2012.
Taiwanese Office Action for Patent Application TW 100138524, dated Aug. 20, 2015, (4 pages).
Japanese Office Action, Notice of Reasons for Rejection for JP Patent Application JP 2013-536692, dated Jan. 20, 2016, (3 pages).

* cited by examiner

INPUT-PARALLEL/OUTPUT-PARALLEL INVERTER ASSEMBLY CONTROL DEVICE AND METHOD

CROSS-REFERENCE TO RELATED PATENT APPLICATIONS

The present application claims benefit of U.S. provisional application 61/406,265, filed Oct. 25, 2010, which is incorporated herein by reference in its entirety.

BACKGROUND

Fuel cells are often combined into units called "stacks" in which the fuel cells are electrically connected in series and separated by electrically conductive interconnects, such as gas separator plates which function as interconnects. A fuel cell stack may contain conductive end plates on its ends. A generalization of a fuel cell stack is the so-called fuel cell segment or column, which can contain one or more fuel cell stacks connected in series (e.g., where the end plate of one stack is connected electrically to an end plate of the next stack). A fuel cell segment or column may contain electrical leads which output the direct current from the segment or column to a power conditioning system. A fuel cell system can include one or more fuel cell columns, each of which may contain one or more fuel cell stacks, such as solid oxide fuel cell stacks. The number of individual fuel cells which make up fuel cell system can be based on the amount of electrical power which fuel cell system is intended to generate. An exemplary fuel system is described in U.S. Pat. No. 7,705,490 entitled Ripple Cancellation, the disclosure of which is incorporated herein by reference in its entirety.

Fuel cells generate power that is converted in a fuel cell power conversion system, also known as a power conditioning system. A power conversion system is a system that alters the characteristics of power produced by a source in some way. For the case of fuel cells, which generate DC (direct current) power, this can mean the conversion of the DC power to different (e.g., higher) voltage and/or current levels, the conversion to AC (alternating current) power with a particular RMS (root mean squared) voltage, the generation of three-phase AC power, or all of the above. Typically, a change in the voltage level of a DC source can be accomplished using a DC/DC (direct current/direct current) converter, whereas the change from DC to AC is accomplished using a DC/AC (direct current/alternating current) converter or inverter.

SUMMARY

Embodiments are directed to architectures and methods for operating inverters in fuel cell systems.

In a first embodiment, an inverter structure and method of control are provided wherein multiple networked input-parallel/output-parallel inverters are controlled as a single inverter assembly by a master controller.

In a second embodiment, a control methodology maximizes the fuel cell output for split bus inverter architecture using fault tolerant control in fuel cell system having multiple segments with different power capacity to deliver multiple loads at different power level.

In a third embodiment, a control methodology controls fuel cell current from multiple segments supplying multiple loads.

DETAILED DESCRIPTION

In large systems in which multiple inverters are use, the efficiency of the overall system may be improved by controlling the inverters to achieve a particular objective of a power supply application, to balance the load between inverters with paralleled inputs and outputs, and to change the architecture of power modules in response to changes in equipment status, to load requirements, and other factors.

First Embodiment

In this embodiment, multiple networked input-parallel/output-parallel inverters are controlled as a single inverter assembly by a master controller.

In a fuel cell system where the inverter is composed of a network of input-parallel/output-parallel inverters, a device for control is provided to establish the loading on each inverter. Without such device to control input-parallel inverters, the inputs may not be paralleled. When the inputs may not be paralleled, a single inverter failure limits the fuel cell system output power to N−1.

In a typical fuel cell system, an inverter may be treated as a monolithic structure where a single set of load commands are provided. Alternatively, a fuel cell system may utilize parallel only inverter outputs such that inverter inputs are not shared. In this alternative approach, the relative power command to each inverter in the network need not be considered.

Figure 1:
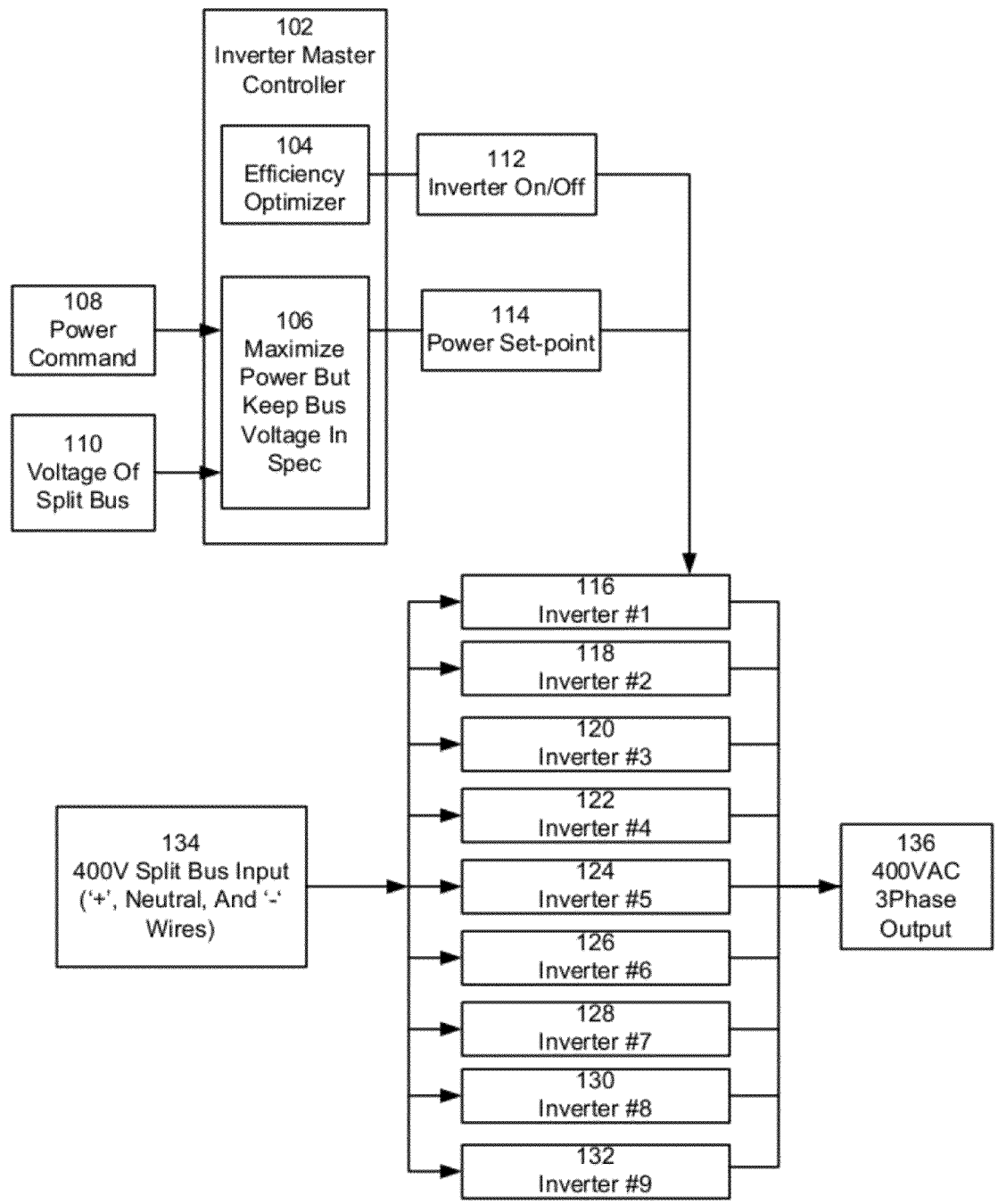
FIG. 1 is a block diagram illustrating a network of inverters having paralleled inputs and paralleled outputs according to an embodiment.

FIG. 1 is a block diagram illustrating a network of inverters having paralleled inputs and paralleled outputs according to an embodiment.

An inverter master controller 102 in operation sends power commands to the networked inverters, such as inverters #1-9 (blocks 116-132). While nine inverters are illustrated, the number of inverters that may be controlled is not so limited. Thus, there may be 2 to 20 separate inverters, for example. The inverter master controller 102 may be a general or special purpose computer or a dedicated control device or circuit. The inverter master controller 102 includes an efficiency optimizer unit 104 and a power output calculator unit 106. Units 104 and 106 may be separate devices or circuits in the controller 102 or they may comprise software or hardware based algorithms that are stored on the computer or control device 102. The inverter master controller 102 receives a power command 108 (e.g., power set-point and power factor set-point) and a split bus voltage value 110 from the overall fuel cell system controller (not shown for clarity) that regulates the entire fuel cell system. The system controller may comprise the same computer or device as the inverter master controller 102 or a different computer or device. If the system controller comprises the same computer or device as the inverter master controller, then the power command 108 and voltage value 110 are communicated internally within the computer or device. If the system controller comprises a different computer or device than the inverter master controller 102, then command 108 and value 110 may be communicated via a wire or wirelessly or using any other suitable communication methods.

The master controller 102 is in wired or wireless communication with each of the inverters (blocks 116-132). The master controller can control the power set point and the on/off state of each individual inverter using the inverter on/off 112 and power set point 114 commands. Thus, the on/off state of each inverter 116-132 and/or the power set point of each inverter may be different from that of one or more other inverters. All of the inverters 116-132 receive the same direct current (DC) input 134 from one or more fuel cell stacks or columns (not shown in FIG. 1). For example, as shown in FIG. 1, all of the inverters 116-132 receive the same 400V split bus input 134 from positive, negative and optionally neutral wires as parallel inputs, as will be described in more detail below and/or as described in U.S. Pat. No. 7,705,490. All of the inverters 116-132 output a common alternating current (AC) parallel output 136, such as a 400 V three phase AC parallel output, to a load.

The master controller 102 can send the on/off command 112 to dictate whether a particular inverter should be on or off using the efficiency optimizer unit 104.

The master controller 102 can sense the condition of the split bus input 134 to the inverters based on the bus voltage input 110 and ensures that the power commands 112, 114 to the inverters 116-132 are limited such that the split bus input 134 does not collapse.

The master controller 102 can receive inputs from the inverters 116-132 which signal the state of health of each inverter unit 116-132 (two way connections between the inverters and the master controller 102 are not illustrated for clarity).

Figure 2:
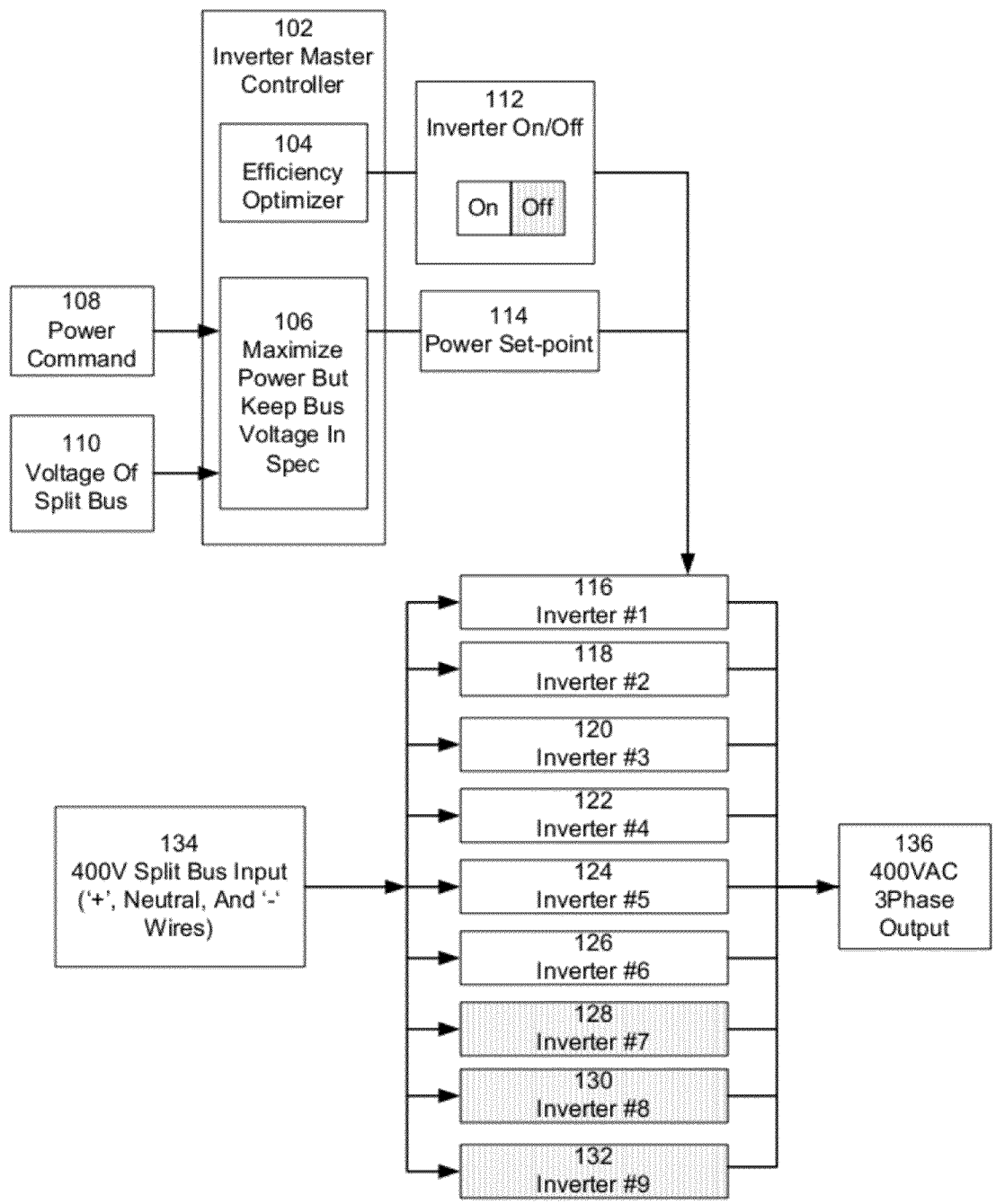
FIG. 2 is a block diagram illustrating a network of inverters having paralleled inputs and paralleled outputs in which three of nine inverters have been commanded to an off state according to an embodiment.

The efficiency optimizer unit 104 evaluates the power output which is calculated, and provides on-off commands for the network of inverters to optimize efficiency. For example, if the load is a full load, all inverters are on. If the load is only 50% of maximum designed load, then some of the inverters, (e.g., 3 of 9 inverters shown as blocks 128-132) may be switched off by unit 104 using command 112 to reduce the fraction of non-operating parasitic inverters, as shown in FIG. 2.

The power output calculator 106 determines and provides the output power setting command to the inverters as the smaller of two calculated parameters: a) power command 108 from the overall fuel cell system controller that regulates the fuel cell system; and b) power which can be maintained without collapse of the split bus 134. The calculator 106 then provides the power set point command 114 to each inverter to set the output power of each inverter.

Should the master controller 102 detect the failure of one inverter, it will automatically provide new output power commands 112 and/or 114 to the remaining inverters. If the load set point divided by the total number of inverters is less than the capability of the inverter modules, then in the new final state each inverter will be commanded to take more power in order to achieve the original setpoint (with one inverter out of service). If the load set point divided by the number of inverters equals the inverter module's rating, then the inverter master controller will reduce the available output of the system and pass this information to the system controller so that fuel input to the fuel cells of the segments may be reduced.

In an embodiment, the inverter modular structure may be composed of blind-mated assemblies. In other words, each inverter 116 to 132 is located on a separate level of a rack in a power conditioning module housing. A field service person may "rack out" a failed inverter and replace and "rack-in" a new inverter. When the new inverter communicates with the master controller as healthy and ready for load, the master controller 102 will command it on and restore the prior load sharing between the inverters.

In the event where the efficiency optimizer 104 has turned off some inverters (such as turning off inverters 7, 8 and 9), and the system then suffers the loss of an inverter (such as inverter 1), the efficiency optimizer 104 may rescind the command to hold inverter 7 in the off state, restart that inverter, and establish the same load sharing. This embodiment is illustrated in FIG. 2.

In another embodiment, the system controller provides a power factor command to the inverter master controller 102 in addition to the command 108 and value 110. The inverter master controller 102 passes the power factor command to each of the inverter modules (blocks 116-132) along with power set point command and 114 and the on/off command 112.

In an alternative embodiment, the elements illustrated in FIG. 1 and FIG. 2 may be used for a network of inverters in an uninterruptable power module (UPM), which is connected to support a load without a grid reference. In this case, the commands to the inverters are slightly different:

A sine wave is generated as a reference by the master controller. The output of the network of inverters is monitored and compared to the sine wave reference. A PI controller (not illustrated) may calculate current command values to be sent to the inverters to minimize the error between the output voltage and the reference voltage. In the case where the input bus is beginning to collapse and both input bus voltage and output bus voltage cannot be maintained, the master controller 102 will send a signal to the overall system controller to provide warning and indication that the customer load will be de-energized. In some cases, this may allow for a building management system (BMS) to subsequently turn-off some fraction of the building load.

Second Embodiment

In an embodiment, a control methodology maximizes the fuel cell output for split bus inverter architecture using fault tolerant control.

Figure 3:
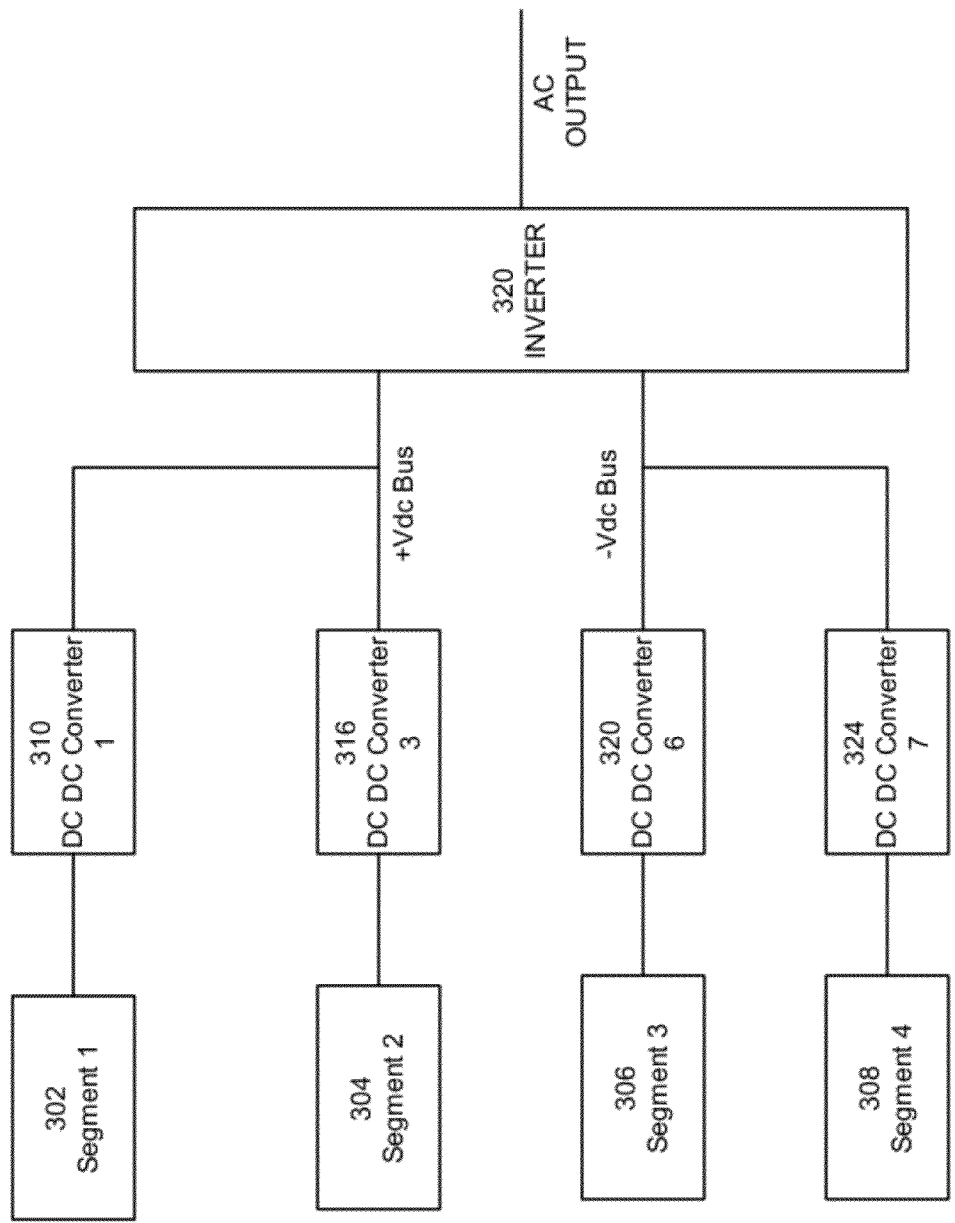
FIG. 3 is a block diagram illustrating a typical split bus inverter configuration.

FIG. 3 is a block diagram illustrating a typical split bus inverter configuration. In this configuration, the power on the positive bus (labeled as "+ve Vdc bus" or +ve bus) and the negative bus (labeled as "−ve Vdc bus" or −ve bus") being provided from the fuel cell segments to the inverter through optional DC/DC converters should be balanced for a balanced inverter load. As illustrated in FIG. 3, fuel cell segment #1 302 and fuel cell segment #2 304 power the +ve bus through respective DC/DC converters 310, 312, while fuel cell segment #3 306 and fuel cell segment #4 308 power the −ve bus through respective DC/DC converters 314, 316. If fuel cell segment #1 is weak then the power generated from fuel cell segment #3 and fuel cell segment #4 will reduce by the same amount. To maximize the power generation, the fuel cell segments need to be swapped.

Figure 4:
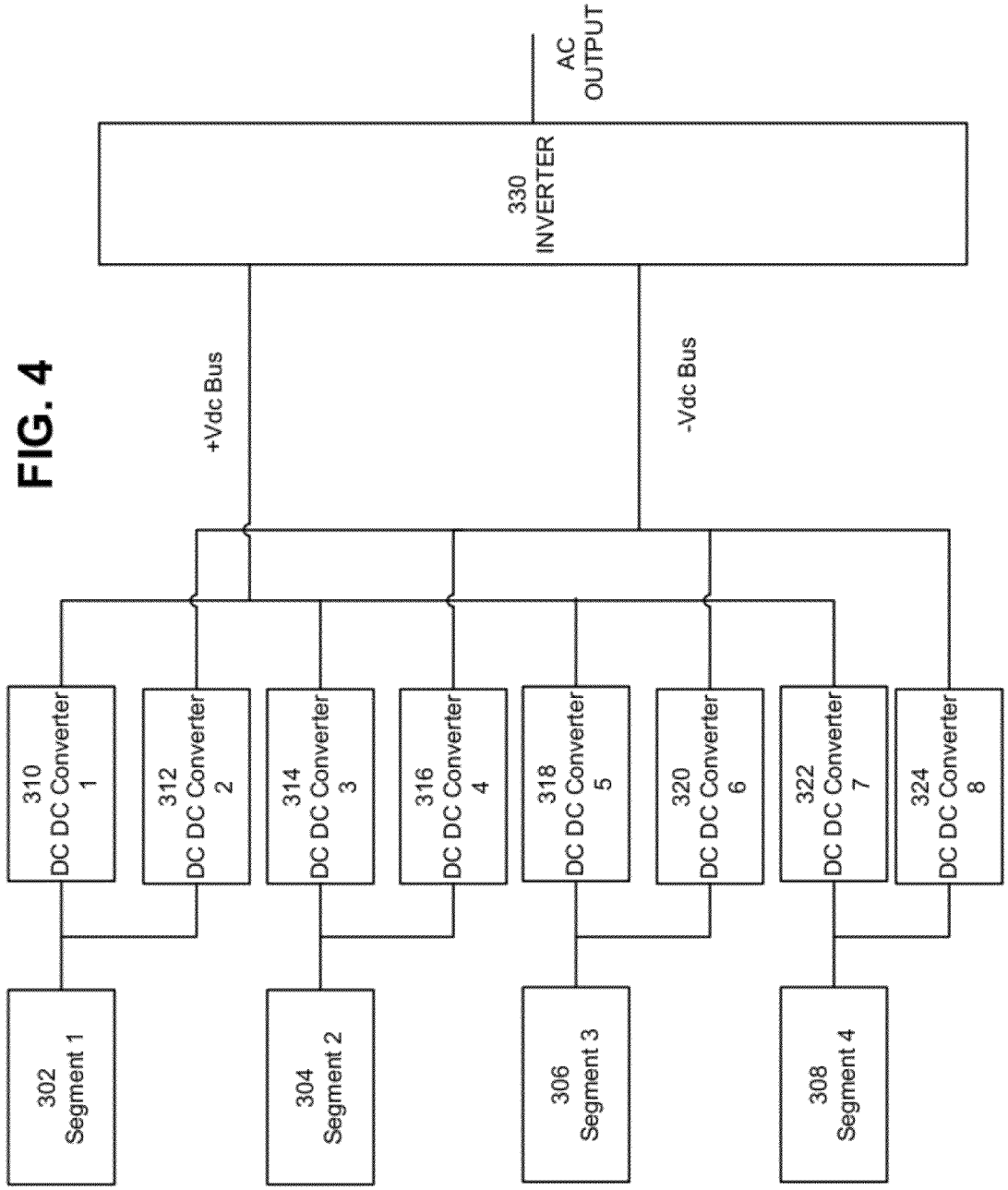
FIG. 4 is a block diagram illustrating a split bus inverter configuration according to an embodiment.

In this embodiment shown in FIG. 4, each fuel cell segment (blocks 302-308) has two DC/DC converters, one generating current on the +ve and one generating current on the −ve bus. In other words, each fuel cell segment 302-308 output is connected to two DC/DC converters. Each of the pair of DC/DC converters that are dedicated to a particular segment is connected to opposite polarity bus being provided to the inverter 330. For example, the output of the segment #1 302 is split to DC/DC converter #1 310 and DC/DC converter #2 312. The output of converter 310 is provided to the +ve bus and the output of converter 312 is provided to the −ve bus. The same is true for other segments 304-308 and their respective pairs of DC/DC converters 314-324. The +ve bus and the −ve bus are provided as inputs to the inverter 330. Inverter 330 outputs an AC output. The inverter 330 may comprise the inverter assembly of the first embodiment or any suitable multiple or single inverter(s) known in the art. While 4 segments are shown in FIG. 4, any number of segments, such as 2 to 20, for example 6 to 12 segments, may be used. Furthermore, while U.S. Pat. No. 7,705,490 describes providing positive and negative leads from a segment to separate DC/DC converters, in this embodiment, each DC/DC converter in the pair of converters receives the output of both the positive and negative leads from each segment. Thus, the positive and negative lead output from segment 302 is provided to converter 310 and to converter 312.

Hence, each fuel cell segment 302-308 direct current can be individually controlled for power generation making it independent of the other fuel cell segments. The DC/DC converter may be commanded to draw the maximum current a fuel cell segment can draw based on its condition and health. If one DC/DC converter fails, then it is possible to maximize the power by redistributing the current commands to other DC/DC converters for maximum power operation.

The operation of the configuration illustrated in FIG. 4 is described below in reference to particular exemplary methods and examples. However, the description is not intended to be limiting.

Method 1

If a DC/DC converter connected to one conductivity (e.g., +ve or −ve) bus fails, then a DC/DC converter connected to the opposite conductivity (e.g., −ve or +ve) bus is turned off to compensate for the failure. For example, if DC/DC converter #1 310 connected to the positive bus fails, then by turning off any one of DC/DC #2 312, DC/DC #4 316, DC/DC #6 320, or DC/DC #8 324, which are connected to the negative bus, the power may be maximized and still pass same current through all fuel cell segments. DC/DC #2 may be increased to its maximum current or load capability.

Example of Method 1.

An exemplary load on each converter is 10 Amps, and load capability of each converter is 15 Amps.

Table 1 illustrates the operation of the system before fault (e.g., before failure of converter 310):

TABLE 1

| | |
|---|---|
| Segment 1 = DC/DC 1 (10 Amps) + DC/DC 2 (10 Amps) = 20 Amps = | Full current |
| Segment 2 = DC/DC 3 (10 Amps) + DC/DC 4 (10 Amps) = 20 Amps = | Full current |
| Segment 3 = DC/DC 5 (10 Amps) + DC/DC 6 (10 Amps) = 20 Amps = | Full current |
| Segment 4 = DC/DC 7 (10 Amps) + DC/DC 8 (10 Amps) = 20 Amps = | Full current |
| Total Load = 80 Amps = | Full current = Full power |

Table 2 shows the conditions after fault to DC/DC 1 (i.e., after failure of converter 310):

TABLE 2

| | | |
|---|---|---|
| Segment 1 = DC/DC 1 (FAULT) + DC/DC 2 (15 Amps) = | 15 Amps = | 75% Nominal current |
| Segment 2 = DC/DC 3 (15 Amps) + DC/DC 4 (Turned OFF) = | 15 Amps = | 75% Nominal current |
| Segment 3 = DC/DC 5 (10 Amps) + DC/DC 6 (10 Amps) = | 20 Amps = | Nominal current |
| Segment 4 = DC/DC 7 (10 Amps) + DC/DC 8 (10 Amps) = | 20 Amps = | Nominal current |
| Total Load = | 70 Amps = | 87.5% current = 87.5% power |

Method 2

Method 2 includes, in response to a failure of one DC/DC converter in a pair connected to one conductivity bus, increasing an output current of the other one DC/DC converter in the pair to maximum value, increasing an output current of remaining DC/DC converters connected to the one conductivity bus above the pre-failure current but below the maximum current, and decreasing an output current of remaining DC/DC converters connected to the opposite conductivity bus below the pre-failure current. The total system load remains the same as the total pre-failure load.

If DC/DC converter #1 310 fails, then the following steps may be executed by a DC/DC converter master controller (not shown for clarity). The controller may be a general or special purpose computer, a dedicated device or a circuit.

a) DC/DC converter 2 is taken to maximum current in order to provide a maximum loaded case for fuel cell segment #1 302;

b) "Positive" bus power required is divided by the remaining "positive" bus DC/DC converters—namely DC/DC's 3, 5 and 7 (i.e., 314, 318 and 322). This will require more than nominal current to pass through DC/DCs 3, 5 and 7, and may be limited by the maximum output of each of the DC/DC converters.

c) The DC/DC converters #4, 6 and 8 (i.e., 316, 320 and 324) of the remaining segments 304-308 on the negative bus are loaded to reach full or maximum power, with slightly lower setting since DC/DC converter #2 312 from fuel cell segment #1 302 is taking load. The specific value for the loading of each of DC/DC converters #4, 6, and 8 would be equal to: [Total Current Target−Current from DC/DC converter number two]/3.

It is anticipated that the fuel cell system has the capability to recirculate fuel to provide distribution of the fuel provided but not reacted in fuel cell segment #1 302 to the other three segments. Unless the maximum current rating of DC/DC converter number two=2×nominal, Method 2 will create a case where the loading on segment is slightly reduced, and the loading on the other segments is slightly increased. If the redistribution of the fuel through a means such as anode exhaust stream recirculation (with or without purification) back into the fuel cell stack fuel inlet stream, as described for example in U.S. application Ser. No. 11/491,487, filed on Jul. 24, 2006 and incorporated herein by reference in its entirety, fuel flow may not be increased to support this case. However, if the distribution is not sufficient, then fuel flow may need to be increased to support this maximum output power case. This would mean that while the power setpoint is maintained, the operating efficiency of the unit is diminished while operating in this mode.

Example of Method 2.

Exemplary load on each converter is 10 Amps, and load capability of each converter is 15 Amps.

Table 3 illustrates the operation of the system before fault (e.g., before failure of converter 310):

TABLE 3

| | | |
|---|---|---|
| Segment 1 = DC/DC 1 (10 Amps) + DC/DC 2 (10 Amps) = | 20 Amps = | Nominal current |
| Segment 2 = DC/DC 3 (10 Amps) + DC/DC 4 (10 Amps) = | 20 Amps = | Nominal current |
| Segment 3 = DC/DC 5 (10 Amps) + DC/DC 6 (10 Amps) = | 20 Amps = | Nominal current |
| Segment 4 = DC/DC 7 (10 Amps) + DC/DC 8 (10 Amps) = | 20 Amps = | Nominal current |
| Total Load = | 80 Amps = | Full current = Full power |

Table 4 illustrates the operation after fault to DC/DC converter #1 310

TABLE 4

| | | |
|---|---|---|
| Segment 1 = DC/DC 1 (FAULT) + DC/DC 2 (15 Amps) = | 15 Amps = | 75% Nominal current |
| Segment 2 = DC/DC 3 (13.33 A) + DC/DC 4 (8.33 A) = | 21.67 Amps = | 108.33% Nominal current |
| Segment 3 = DC/DC 5 (13.33 A) + DC/DC 6 (8.33 A) = | 21.67 Amps = | 108.33% Nominal current |
| Segment 4 = DC/DC 7 (13.33 A) + DC/DC 8 (8.33 A) = | 21.67 Amps = | 108.33% Nominal current |
| Total Load = | 80 Amps = | Full current = Full power |

Method 3

In a case where all fuel cell segment currents must always be equal, such as the case of a fuel cell system without anode recirculation or other means to have high stoichiometric conditions within all cells, the following scenario would be executed if DC/DC converter #1 fails:

DC/DC 2 is taken to maximum current (DC/DC 3+4; 5+6; 7+8 must equal DC/DC 2 current as stipulated above for all fuel cell segment currents to equal.)

Total fuel cell current=4×DC/DC max current

Positive bus current=4×DC/DC max current/2

Negative bus current=4×DC/DC max current/2

DC/DC 3, 5, 7=Positive bus current/3=4×DC/DC max current/2/3

DC/DC 4, 6, 8=Negative bus current−DC/DC 2 setting/3= (4×DC/DC max current/2−DC/DC#2)/3.

To generalize the above, in response to a failure of one DC/DC converter in a pair connected to one conductivity bus, increasing an output current of the other one DC/DC converter in the pair to maximum value, keeping an output current of remaining DC/DC converters connected to the one conductivity bus the same as the pre-failure current, and decreasing an output current of remaining DC/DC converters connected to the opposite conductivity bus below pre-failure current. In this method, the total system load post failure is lower than the total pre-failure load.

Example of Method 3.

Exemplary load on each converter is 10 Amps, and load capability of each converter is 15 Amps.

Table 5 illustrates the operation of the system before fault (e.g., before failure of converter 310):

TABLE 5

| | | |
|---|---|---|
| Segment 1 = DC/DC 1 (10 Amps) + DC/DC 2 (10 Amps) = 20 Amps = | Nominal current |
| Segment 2 = DC/DC 3 (10 Amps) + DC/DC 4 (10 Amps) = 20 Amps = | Nominal current |
| Segment 3 = DC/DC 5 (10 Amps) + DC/DC 6 (10 Amps) = 20 Amps = | Nominal current |
| Segment 4 = DC/DC 7 (10 Amps) + DC/DC 8 (10 Amps) = 20 Amps = | Nominal current |
| Total Load = | 80 Amps = Full current = Full power |

Table 6 illustrates the operation after fault to DC/DC converter #1 310

TABLE 6

| | | |
|---|---|---|
| Segment 1 = DC/DC 1 (FAULT) + DC/DC 2 (15 Amps) = | 15 Amps = | 75% Nominal current |
| Segment 2 = DC/DC 3 (10 Amps) + DC/DC 4 (5 Amps) = | 15 Amps = | 75% Nominal current |
| Segment 3 = DC/DC 5 (10 Amps) + DC/DC 6 (5 Amps) = | 15 Amps = | 75% Nominal current |
| Segment 4 = DC/DC 7 (10 Amps) + DC/DC 8 (5 Amps) = | 15 Amps = | 75% Nominal current |
| Total Load = | 60 Amps = | 75% current = 75% power |

In an embodiment, the adjustments in the load may be performed in an "on the fly" manner (i.e., while the fuel cell system is operating).

In an embodiment, the DC/DC converters illustrated in FIG. 4 are connected via a "blind mate" assembly to a backplane. The converters may be arranged in a rack or other suitable housing. Preferably, there are no wirings affixed to the front portion of the DC/DC converter modules. As such, it is possible to remove a failed DC/DC converter module without perturbing the operation of the other DC/DC modules. When one DC/DC converter fails, the DC/DC master controller shifts current as described by either method 1, 2 or 3. When the DC/DC converter is replaced and re-energized, the DC/DC converter detects this and restores proper operation. The replacement may be done by service personnel while the fuel cell system is operational and provides current to a load.

In an embodiment, the logic and examples described above as applied to DC/DC converter failures may also be generalized and applied to weak or failed stack segments (stack columns). The current carrying capability of the remaining segments may be shifted as required per the methods described herein.

In an embodiment, the logic described above as applied to fuel cell segments and may be applied to a configuration of a plurality of hot boxes. In this embodiment, the plurality of hot boxes may be configured in a DC parallel architecture that allows optimizing power of a fuel cell system. In other words, each segment 302-308 may represent a separate hot box containing one or more segments, where the electrical outputs of the hot boxes are connected to the same inverter.

Third Embodiment

Figure 5:
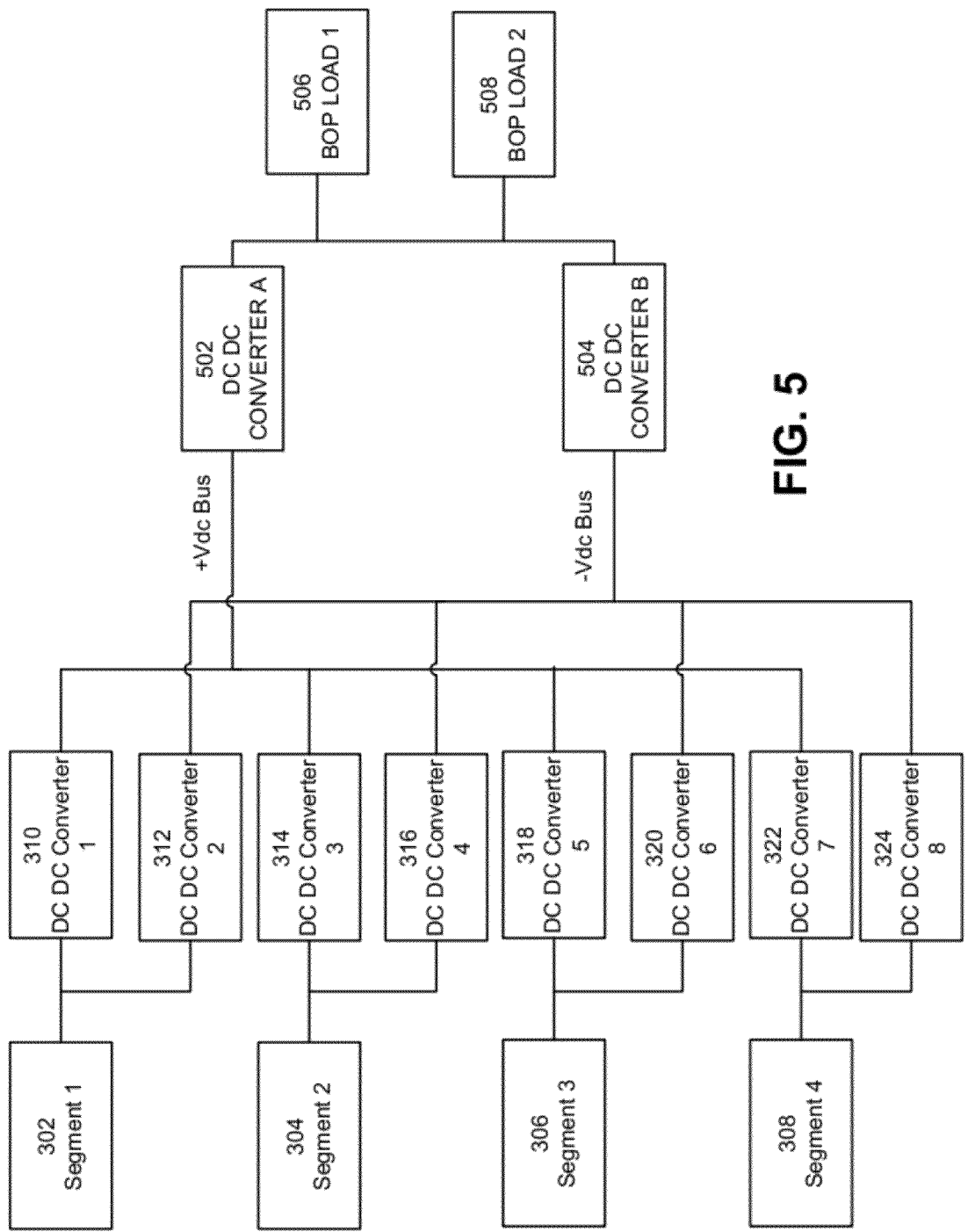
FIG. 5 is a block diagram illustrating an architecture for controlling load balance in a fuel cell system.

FIG. 5 is a block diagram illustrating one architecture for controlling load balance in a fuel cell system. The load on the split bus is balanced by the DC BOP (balance of plant) loads 1 (506) and 2 (508) (e.g., fuel cell system fuel or air blowers). In other words, both DC loads 506 and 508 are connected to the +ve and −ve buses of the split bus shown in FIG. 4. Alternatively, optional additional converters A (502) and B (504) may be added between the split bus and the DC loads 1 and 2 (506 and 508). For example, converter A 502 may be connected to the +ve bus and converter B 504 may be connected to the −ve bus. The DC outputs of converters A and B (502 and 504) are merged and the merged DC output is provided to DC loads 1 and 2 (506 and 508).

If load 1 and 2 are not balanced (equal) without proper control, the fuel cell segments cannot be loaded completely, thus reducing the fuel utilization resulting in decreased efficiency.

Figure 6:
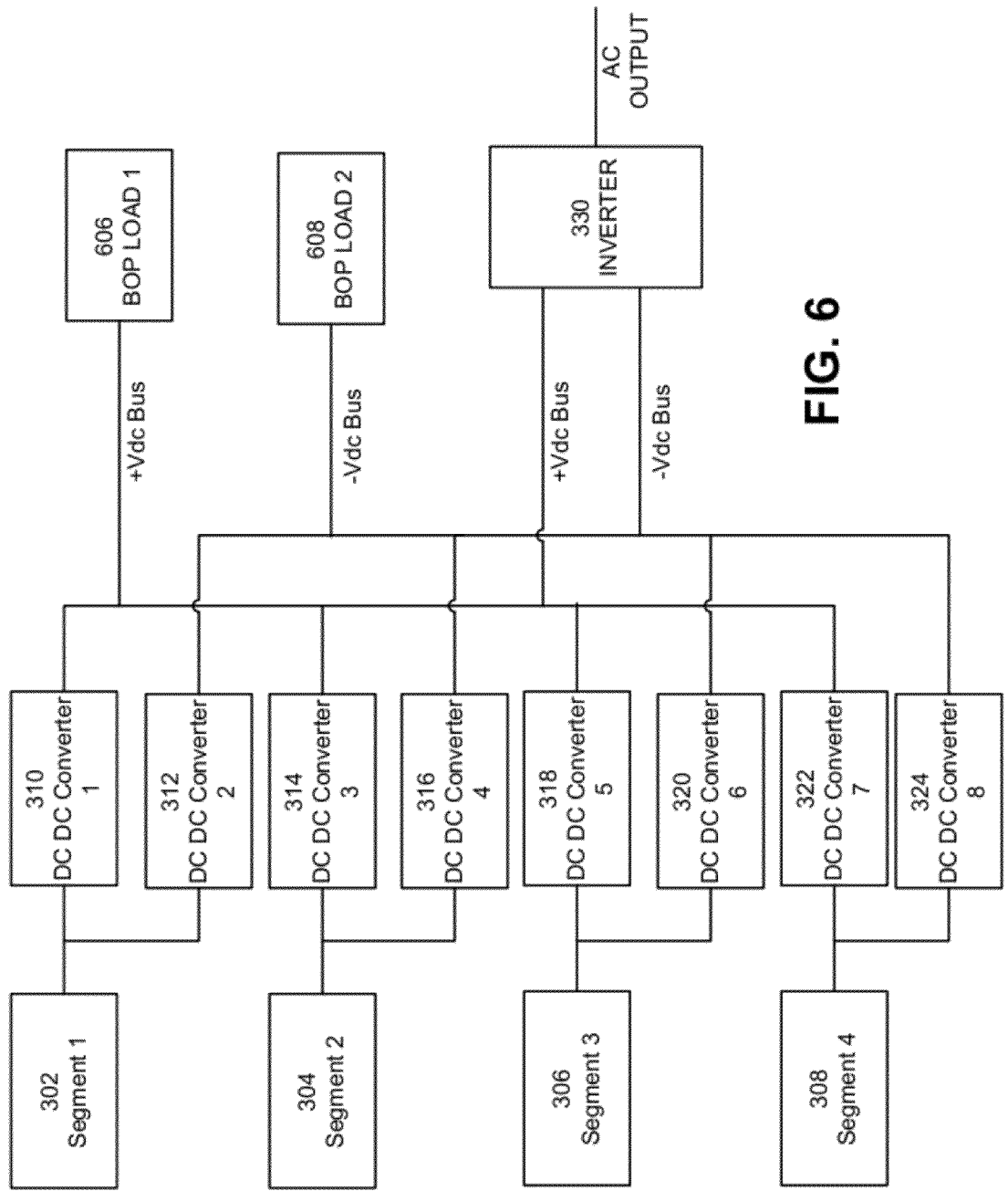
FIG. 6 is a block diagram illustrating a load balancing architecture according to an embodiment.

FIG. 6 is a block diagram illustrating a load balancing architecture according to an embodiment.

In this embodiment, a control methodology splits the fuel cell segment current proportionally to the BOP loads 606 and 608 on a split bus thus enabling the inverter 330 working on the split bus to export maximum power available from the fuel cell segments. Thus, as shown in FIG. 6, one DC load 606 is connected to the +ve bus and the other DC load 608 is connected to the −ve bus. To generalize this, in a fuel cell system containing a plurality of DC loads, such as BOP loads 606 and 608, a first set of DC loads are connected only to one conductivity bus of a split bus and a second set of DC loads (e.g., some or all the remaining DC loads) are connected only to the other conductivity bus of the split bus. If desired, a third set of DC loads may be connected to both buses as shown in FIG. 5.

According to one element of this embodiment, a load demand is detected using a total fuel cell segment current controller and a voltage loop PI controller.

Figure 7:
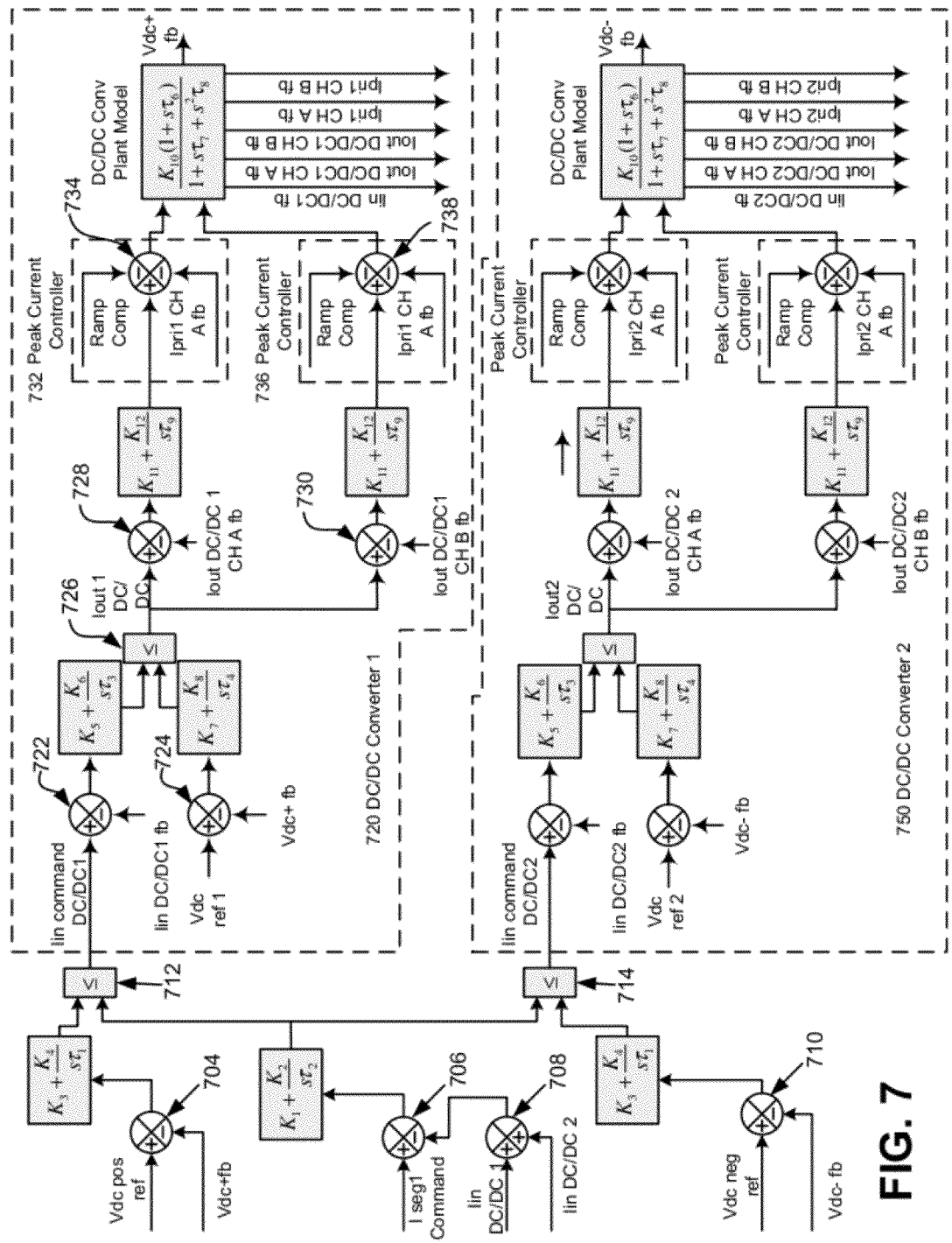
FIGS. 7 and 8 are block diagrams further illustrating elements of a methodology according to an embodiment.
Figure 8:
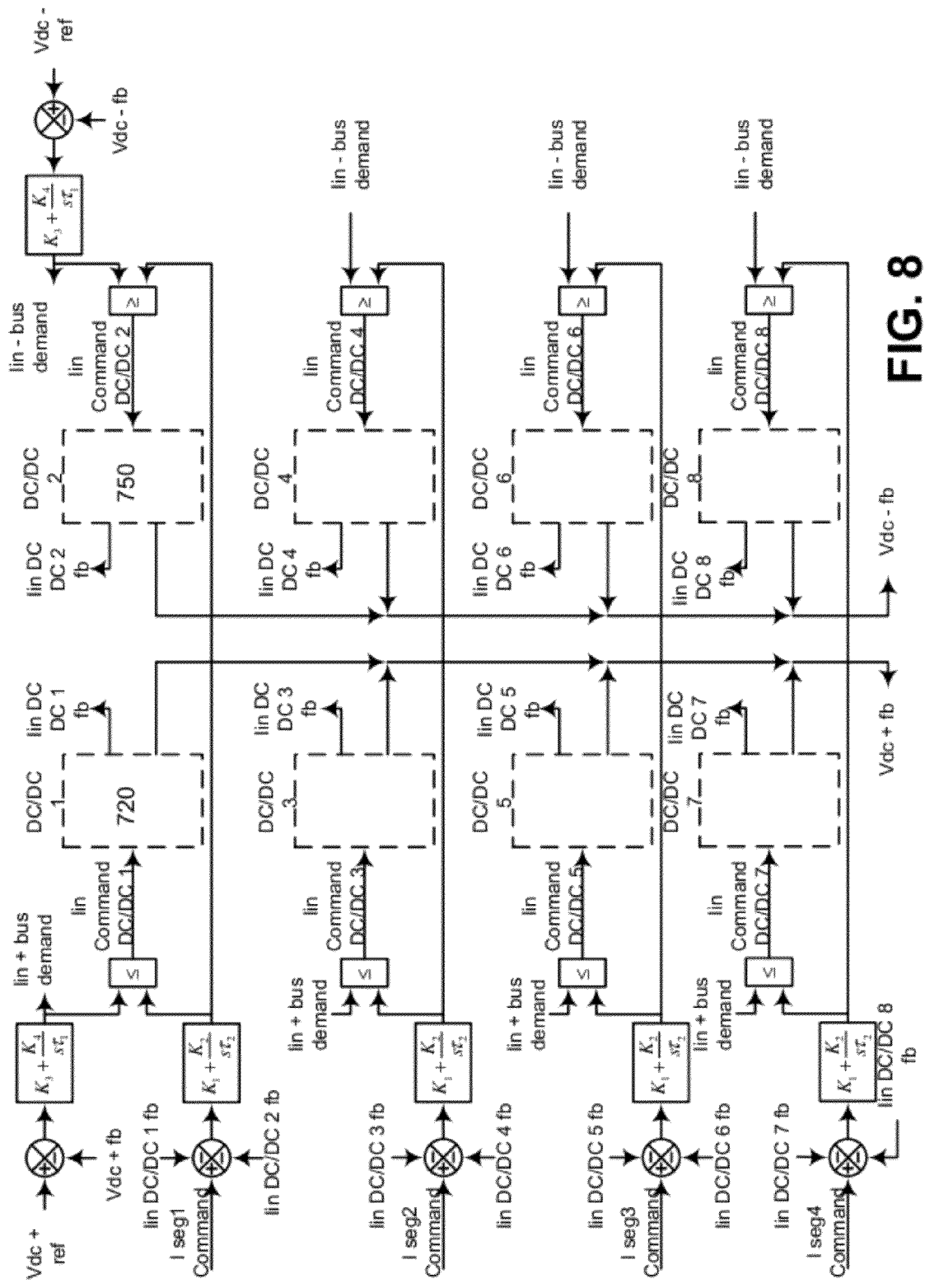

FIGS. 7 and 8 are block diagrams further illustrating elements of a methodology according to an embodiment.

Referring to FIGS. 7 and 8, for loads connected to the split bus there are two voltage loops which control the split bus voltage. Proportional/integrated (PI) controllers are utilized to control an outer voltage loop and an inner current loop. The total fuel cell segment current loop controls the total fuel cell segment current. Referring to FIG. 7, a DC reference voltage is compared to a DC positive feedback voltage (equal to the output of the DC/DC converter 1 720 at a point in time) by a comparator 704, which comparator determines the magnitude of a difference between the two inputs. A transfer function is applied to the output of comparator 704.

The input currents to both DC/DC converter 1 720 and DC/DC converter 2 750 are summed by a summer 708. The total current is compared to a current commanded from the segment by a comparator 706, which comparator determines the magnitude of a difference between the two inputs. A transfer function is applied to the output of comparator 706.

Referring to the schematic of DC/DC converter 1 720 (DC/DC converter 2 750 operates in a manner similar to DC/DC converter 1 720 and will not be separately described), a comparator 712 receives the outputs of comparators 704 and 706 (after application of the appropriate transfer functions) and determines the lesser of the two outputs. The output of comparator 712 is applied to a comparator 722 as the current command input to the DC/DC converter 1 720. The 722 comparator determines the magnitude of a difference between the two inputs. The comparator 722 compares the current command input to a feedback current (equal to the current input of the DC/DC converter 1 720 at a point in time). A transfer function is applied to the output of comparator 722.

A DC reference voltage is compared to a DC positive feedback voltage (equal to the output of the DC/DC converter 1 720 at a point in time) by a comparator 724, which comparator determines the magnitude of a difference between the two inputs. A transfer function is applied to the output of comparator 724. A comparator 726 receives the outputs of comparators 722 and 724 (after application of the appropriate transfer functions) and determines the lesser of the two outputs. The output of comparator 726 is applied to comparators 728 and 730. The comparator 728 also receives a feed back current from a channel A of the DC/DC converter 1 720. The comparator 728 compares the two inputs to determine the magnitude of a difference between the two inputs. A transfer function is applied to the output of comparator 728. Similarly, the comparator 730 receives a feed back current from a channel B of the DC/DC converter 1 720. The comparator 730 determines the magnitude of a difference between the two inputs. A transfer function is applied to the output of comparator 730.

The outputs of comparators 728 and 730 are supplied to peak current controllers 732 and 736 respectively. The peak current controllers operate comparators 734 and 738 respectively. Comparator 734 receives the output of comparator 728 (after application of a transfer function), a ramp comparison signal and a channel A feedback current and determines the magnitude of a difference between the output of comparator 728 and the two inputs. Comparator 738 receives the output of comparator 730 (after application of a transfer function), a ramp comparison signal and a channel B feedback current and determines the magnitude of a difference between the output of comparator 730 and the two inputs. The outputs of the peak controller 732 and the peak controller 736 are received by a DC/DC converter 1 plant model 740. A transfer function is applied by plant model 740. The out of plant model 740 is the DC positive feedback voltage used by the various comparators.

The minimum of the voltage loop PI and fuel cell segment current loop PI is provided as input current command for each of the DC/DC converters. If the total load demand is less than the total fuel cell segment current command, then the individual voltage loop PI's take care of the fuel cell segment current distribution to ensure the load demand is met. If the total load is more than the fuel cell segment current command and if the −ve bus load is less than the +ve bus load, the −ve voltage loop PI commands the fuel cell segment current required to supply the load connected to the −ve bus and the total fuel cell segment current PI loop will determine the current supplied by the DC/DC Converted to the load connected to the +ve bus. If there are n fuel cell segments then this control method can be applied to all the n−1 fuel cell segments while one fuel cell segment is assigned to the voltage loop to maintain the load voltage.

FIG. 8 illustrates a control method for four fuel cell segments. DC/DC converter 1 720 and DC/DC converter 2 750 are illustrated in detail in FIG. 7. DC/DC converters 3, 5 and 7 are connected to a positive bus and are equivalent to DC/DC 1 720. DC/DC converters 4, 6 and 8 are connected to a negative bus and are equivalent to DC/DC 2 750. While FIG. 8 illustrates a control method for four fuel cell segments, the methodology is not so limited and may be extended to any number of fuel cell segments and any number of fuel cell systems.

The methodology provides for a balance of plan loads to be placed on one or the other bus of the split bus architecture without needing to carefully balance the loads and ensures that maximum power can be drawn from the fuel cell stacks. Without this capability, the maximum output current setting for each DC/DC and stack fuel cell segment could not be reached.

While many embodiments were described above, each feature or step of any embodiment may be used in combination with one or more features or steps of one or more other embodiments in any suitable combination.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Further, words such as "thereafter," "then," "next," etc. are not intended to limit the order of the steps; these words are simply used to guide the reader through the description of the methods.

One or more block/flow diagrams have been used to describe exemplary embodiments. The use of block/flow diagrams is not meant to be limiting with respect to the order of operations performed. The foregoing description of exemplary embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

Control elements may be implemented using computing devices (such as computer) comprising processors, memory and other components that have been programmed with instructions to perform specific functions or may be implemented in processors designed to perform the specified functions. A processor may be any programmable microprocessor, microcomputer or multiple processor chip or chips that can be configured by software instructions (applications) to perform a variety of functions, including the functions of the various embodiments described herein. In some computing devices, multiple processors may be provided. Typically, software applications may be stored in the internal memory before they are accessed and loaded into the processor. In some computing devices, the processor may include internal memory sufficient to store the application software instructions.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

The preceding description of the disclosed embodiments is provided to enable any person skilled in the art to make or use the described embodiment. Various modifications to these embodiments will be readily apparent to those skilled in the art, and the generic principles defined herein may be applied to other embodiments without departing from the scope of the disclosure. Thus, the present invention is not intended to be limited to the embodiments shown herein but is to be accorded the widest scope consistent with the following claims and the principles and novel features disclosed herein.

What is claimed is:

1. A method, comprising controlling multiple networked input-parallel/output-parallel inverters of a fuel cell system as a single inverter assembly by a master controller, wherein all of the inverters in the assembly receive the same split bus direct current (DC) input from a plurality of fuel cell stack segments as parallel inputs, and output a common three phase alternating current (AC) parallel output to a load, wherein the master controller:

senses a condition of the split bus DC input and controls a power set point and an on/off state of each individual inverter in the assembly to avoid a power collapse of the split bus DC input, and controls the power set point of each individual inverter in the assembly such that the power set point of a first inverter in the assembly is different from the power set point of a second inverter in the assembly.

2. The method of claim 1, wherein the master controller independently controls the power set point and the on/off state of each individual inverter in the assembly.

3. The method of claim 1, wherein the master controller independently controls the power set point of the first and the second inverter.

4. The method of claim 1, wherein the first inverter in the assembly is on while a second inverter in the assembly is off.

5. The method of claim 4, wherein the master controller independently controls the on/off state of the first and the second inverter.

6. The method of claim 1, wherein the fuel cell system output is connected to a building load, and a building management system uses the master controller to turn off a fraction of the inverters in the assembly to the building load.

7. The method of claim 1, wherein the master controller controls a power set point of each individual inverter in the assembly such that the power set point of each individual inverter is set to provide a power output for a load in response to at least one of the individual inverters not contributing to the power output.

8. The method of claim 1, wherein the master controller receives input signals indicating a state of health for each individual inverter in the assembly.

9. The method of claim 8, wherein the master controller detects a failure of an individual inverter in the assembly and controls the power set point of each remaining individual inverter in the assembly.

10. The method of claim 1, wherein the master controller evaluates a power output of the inverters in the assembly and the controller controls an on/off state of each individual inverter in the assembly to improve efficiency by signaling at least one of the inverters of the assembly to switch to an off state in response to a load being less than the maximum load of the inverters in the assembly.

11. The method of claim 1, wherein the master controller provides to the inverters in the assembly a power set point command, an on/off state command, and a power factor command.

12. A method, comprising controlling multiple networked input-parallel/output-parallel inverters of a fuel cell system as a single inverter assembly by a master controller, wherein the master controller:
controls a power set point of each individual inverter in the assembly such that the power set point of a first inverter in the assembly is different from the power set point of a second inverter in the assembly,
controls an on/off state of each individual inverter in the assembly,
receives input signals indicating a state of health for each individual inverter in the assembly,
detects a failure of an individual inverter in the assembly and controls the power set point of each remaining individual inverter in the assembly, and
increases the power set point of each remaining individual inverter in the assembly in response to determining that a load set point divided by a number of remaining individual inverters is less than a capability of each remaining individual inverter in the assembly or decreases the power set point of each remaining individual inverter in the assembly in response to determining that a load set point divided by a number of remaining individual inverters is equal to a capability of each remaining individual inverter in the assembly.

13. The method of claim 12, wherein the master controller increases the power set point of each remaining individual inverter in the assembly in response to determining that a load set point divided by a number of remaining individual inverters is less than a capability of each remaining individual inverter in the assembly and decreases the power set point of each remaining individual inverter in the assembly in response to determining that a load set point divided by a number of remaining individual inverters is equal to a capability of each remaining individual inverter in the assembly.

14. The method of claim 12, wherein the master controller signals at least one of the inverters of the assembly to switch to an on state in response to detecting a failure of a different individual inverter in the assembly.

15. The method of claim 12, wherein the master controller restores the power set points of each of the individual inverters in the assembly in response to receiving an input signal indicating a healthy and ready state of an individual inverter at a location of a previously detected failed individual inverter in the assembly.

16. The method of claim 12, wherein the master controller increases the power set point of each remaining individual inverter in the assembly in response to determining that the load set point divided by the number of remaining individual inverters is less than the capability of each remaining individual inverter in the assembly.

17. The method of claim 12, wherein the master controller decreases the power set point of each remaining individual inverter in the assembly in response to determining that the load set point divided by the number of remaining individual inverters is equal to the capability of each remaining individual inverter in the assembly.

18. A method, comprising controlling multiple networked input-parallel/output-parallel inverters of a fuel cell system as a single inverter assembly by a master controller, wherein the master controller:
controls a power set point of each individual inverter in the assembly such that the power set point of a first inverter in the assembly is different from the power set point of a second inverter in the assembly, and
provides a power output setting command for the inverters in the assembly as the smaller of a power command from a fuel cell system controller that regulates the fuel cell system and a power which can be maintained without collapse of a split bus direct current (DC) input to the inverters in the assembly, and
controls the power set point of each of the individual inverter in the assembly to provide the power output.

19. A method, comprising controlling multiple networked input-parallel/output-parallel inverters of a fuel cell system as a single inverter assembly by a master controller, wherein the master controller:
controls a power set point of each individual inverter in the assembly such that the power set point of a first inverter in the assembly is different from the power set point of a second inverter in the assembly,
monitors a power output of the inverters in the assembly,
compares the power output to a generated sine wave reference,
calculates a current command value to minimize an error between an output voltage of the power output and a reference voltage of the generated sine wave reference, and
provides a current command with the current command value to the inverters in the assembly.

* * * * *